US011841799B2

(12) United States Patent
Guan et al.

(10) Patent No.: US 11,841,799 B2
(45) Date of Patent: Dec. 12, 2023

(54) GRAPH NEURAL NETWORK ACCELERATOR WITH ATTRIBUTE CACHING

(71) Applicant: T-Head (Shanghai) Semiconductor Co., Ltd., Shanghai Free Trade Area (CN)

(72) Inventors: Tianchan Guan, Shanghai (CN); Heng Liu, Shanghai (CN); Shuangchen Li, Sunnyvale, CA (US); Hongzhong Zheng, Los Gatos, CA (US)

(73) Assignee: T-Head (Shanghai) Semiconductor Co., Ltd., Shanghai Free Trade Area (CN)

( * ) Notice: Subject to any disclaimer, the term of this patent is extended or adjusted under 35 U.S.C. 154(b) by 112 days.

(21) Appl. No.: 17/581,104

(22) Filed: Jan. 21, 2022

(65) Prior Publication Data

US 2023/0064080 A1    Mar. 2, 2023

(30) Foreign Application Priority Data

Aug. 30, 2021  (CN) .......................... 202111004822.3

(51) Int. Cl.
G06F 12/0811  (2016.01)
G06F 12/121   (2016.01)
G06N 3/063    (2023.01)
(52) U.S. Cl.
CPC ........ *G06F 12/0811* (2013.01); *G06F 12/121* (2013.01); *G06N 3/063* (2013.01); *G06F 2212/604* (2013.01)

(58) Field of Classification Search
None
See application file for complete search history.

(56) References Cited

U.S. PATENT DOCUMENTS

| 9,076,107 | B2 | 7/2015 | Cameron et al. |
|---|---|---|---|
| 10,373,053 | B2 | 8/2019 | Barham et al. |
| 10,387,771 | B2 | 8/2019 | Judd et al. |
| 10,467,795 | B2 | 11/2019 | Sarel et al. |
| 10,504,022 | B2 | 12/2019 | Temam et al. |
| 10,635,969 | B2 | 4/2020 | Amir et al. |
| 2017/0103298 | A1 | 4/2017 | Ling et al. |
| 2017/0103299 | A1 | 4/2017 | Aydonat et al. |
| 2018/0075339 | A1 | 3/2018 | Ma et al. |
| 2018/0121796 | A1 | 5/2018 | Deisher et al. |
| 2018/0349368 | A1* | 12/2018 | Bellingham ........... H04N 21/84 |
| 2019/0042948 | A1 | 2/2019 | Lee et al. |

(Continued)

*Primary Examiner* — Kaushikkumar M Patel

(57) ABSTRACT

This application describes a hardware accelerator, a computer system, and a method for accelerating Graph Neural Network (GNN) node attribute fetching. The hardware accelerator comprises a GNN attribute processor; and a first memory, wherein the GNN attribute processor is configured to: receive a graph node identifier; determine a target memory address within the first memory based on the graph node identifier; determine, based on the received graph node identifier, whether attribute data corresponding to the received graph node identifier is cached in the first memory at the target memory address; and in response to determining that the attribute data is not cached in the first memory: fetch the attribute data from a second memory, and write the fetched attribute data into the first memory at the target memory address.

20 Claims, 8 Drawing Sheets

(56) References Cited

U.S. PATENT DOCUMENTS

| | | |
|---|---|---|
| 2019/0050717 A1 | 2/2019 | Temam et al. |
| 2019/0139622 A1 | 5/2019 | Osthege |
| 2019/0286972 A1 | 9/2019 | El Husseini et al. |
| 2019/0303762 A1 | 10/2019 | Sui et al. |
| 2019/0325309 A1 | 10/2019 | Flamant |
| 2019/0339967 A1* | 11/2019 | Moondhra .......... G06F 16/2246 |
| 2019/0384861 A1* | 12/2019 | Ghoting .............. G06Q 10/105 |
| 2020/0034713 A1 | 1/2020 | Golovashkin et al. |
| 2020/0249924 A1 | 8/2020 | Xu |
| 2020/0279151 A1 | 9/2020 | Li et al. |
| 2020/0293838 A1 | 9/2020 | Li et al. |
| 2021/0049467 A1 | 2/2021 | Riedmiller et al. |
| 2021/0192321 A1 | 6/2021 | Zhang |
| 2021/0192358 A1 | 6/2021 | Song et al. |
| 2021/0241111 A1 | 8/2021 | Liu et al. |
| 2021/0248073 A1* | 8/2021 | Lin .................... G06F 12/0646 |
| 2021/0272018 A1 | 9/2021 | Casas et al. |
| 2021/0319324 A1 | 10/2021 | Mueller et al. |
| 2021/0326389 A1 | 10/2021 | Sankar et al. |
| 2021/0374143 A1 | 12/2021 | Neill |
| 2022/0114103 A1* | 4/2022 | Miller ................. G06F 12/0875 |
| 2022/0342934 A1* | 10/2022 | Guan .................. G06F 16/9024 |
| 2022/0417324 A1* | 12/2022 | Han ........................ G06N 5/01 |

* cited by examiner

GRAPH NEURAL NETWORK ACCELERATOR WITH ATTRIBUTE CACHING

CROSS REFERENCE TO RELATED APPLICATION

This application claims priority to and benefits of Chinese patent Application No. 202111004822.3, filed with the China National Intellectual Property Administration (CNIPA) on Aug. 30, 2021. The entire contents of the above-identified application are incorporated herein by reference.

TECHNICAL FIELD

The disclosure relates generally to accelerating graph neural networks (GNNs) computations. More specifically, this disclosure relates to a hardware accelerator, a computer system, and a method for accelerating GNN operations with multi-level attribute caching.

BACKGROUND

While traditional deep learning models are good at pattern recognition and data mining by capturing hidden patterns of Euclidean data (e.g., images, text, videos), Graph neural networks (GNNs) have shown to extend the power of machine learning to non-Euclidean domains represented as graphs with complex relationships and interdependencies between objects. Research has shown that GNNs can exceed state-of-the-art performance on applications ranging from molecular inference to community detection.

One of the challenges that have so far precluded the wide adoption of GNNs in industrial applications is the difficulty to scale them to large graphs. For instance, a social media of reasonable size may have hundreds of millions of nodes and billions of edges, where each node or edge may have attribute data that need to be stored and accessed during the GNN computations. In comparison to the fast processing speed of the GNN processing units such as GPU, TPU, NPU, etc., attribute data access from the storage media has become the performance bottleneck of GNNs. This specification describes novel GNN accelerator architectures with multi-level attribute caching to address the scalability issue of GNNs by accelerating attribute data access and improving the overall GNN computation performance.

SUMMARY

Various embodiments of the present specification may include hardware accelerators, systems, methods for accelerating GNN attribute data access.

According to one aspect, a hardware accelerator for accelerating Graph Neural Network (GNN) attribute data access is described. The hardware accelerator may include a first memory configured to store attribute data of graph nodes previously fetched from a second memory, and a GNN attribute processor in data communication with the first memory and the second memory. The GNN attribute processor may be configured to receive a graph node identifier; determine a target memory address within the first memory based on the graph node identifier; determine, based on the received graph node identifier, whether attribute data corresponding to the received graph node identifier is cached in the first memory at the target memory address; and in response to determining that the attribute data is not cached in the first memory: fetch the attribute data from a second memory, and write the fetched attribute data into the first memory at the target memory address.

In some embodiments, the GNN attribute processor may be further configured to, in response to determining that the attribute data corresponding to the received graph node identifier is cached in the first memory but not at the target memory address, swap the attribute data cached in the first memory with existing attribute data previously stored at the target memory address.

In some embodiments, the first memory comprises a graph node identifier table comprising a mapping between graph node identifiers and memory addresses, wherein the memory addresses indicate locations in the first memory in which attribute data corresponding to the graph node identifiers are stored, and to swap the attribute data corresponding to the received graph node identifier with the existing attribute data previously stored at the target memory address, the GNN attribute processor is configured to: obtain, based on the received graph node identifier, a mapped memory address in a graph node identifier table comprising a mapping between graph node identifiers and memory addresses; and swap the attribute data stored at the mapped memory address with the existing attribute data stored at the target memory address of the first memory.

In some embodiments, to determine whether the attribute data corresponding to the received graph node identifier is cached in the first memory, the GNN attribute processor is further configured to: determine a hash value based on the received graph node identifier; and determine whether the hash value exists in the graph node identifier table.

In some embodiments, the GNN attribute processor is further configured to: write into the graph node identifier table an entry comprising the received graph node identifier and the target memory address.

In some embodiments, the first memory comprises a first-level buffer and a second-level buffer, and the mapping in the graph node identifier table is between the graph node identifiers and the memory addresses of the first-level buffer.

In some embodiments, to write the fetched attribute data corresponding to the received graph node identifier into the first memory at the target memory address, the GNN attribute processor is further configured to: write existing attribute data previously stored at the target memory address in the first-level buffer into the second-level buffer; and write the fetched attribute data into the first-level buffer at the target memory address.

In some embodiments, to write the existing attribute data into the second-level buffer, the GNN attribute processor is further configured to: evict a data entry in the second-level buffer with the existing attribute data according to a cache replacement policy, wherein the cache replacement policy comprises at least one of ranking of degree, least recently used (LRU), least-frequently used (LFU), most recently used (MRU), first in first out (FIFO), last in first out (LIFO), or first in last out (FILO).

In some embodiments, to determine whether the attribute data corresponding to the received graph node identifier is cached in the first memory, the GNN attribute processor is further configured to: determine whether the attribute data is cached in the second-level buffer of the first memory based on the received graph node identifier; in response to determining that the attribute data is not cached in the second-level buffer, determine whether the graph node identifier table comprises an entry corresponding to the received graph node identifier; and in response to determining that the graph node identifier table does not comprise the entry corresponding to the received graph node identifier, determine that the attribute data is not cached in the first memory.

In some embodiments, the GNN attribute processor is further configured to: in response to determining that the attribute data corresponding to the received graph node identifier is cached in the second-level buffer, swap the attribute data cached in the second-level buffer with existing attribute data stored at the target memory address in the first-level buffer.

In some embodiments, to determine the target memory address within the first memory, the GNN attribute processor is further configured to: determine the target memory address based on the received graph node identifier and a size of the first memory.

In some embodiments, to determine whether the attribute data corresponding to the received graph node identifier is cached in the first memory, the GNN attribute processor is further configured to: determine that the attribute data is cached in the first memory if either the attribute data is in the second-level RAM or the graph node identifier table comprises an entry corresponding to the received graph node identifier.

In some embodiments, the first-level buffer and the second-level buffer of the first memory are two different sections of a physical memory in the hardware accelerator.

In some embodiments, the first memory is an internal memory located within the hardware accelerator, and the second memory is an external memory located outside of the hardware accelerator.

According to another aspect, a computer-implemented method for accelerating Graph Neural Network (GNN) attribute data access is described. The method includes receiving, by a processor within a GNN accelerator, a graph node identifier of a graph node in a graph; determining, by the processor, a target memory address within the first memory; determining, by the processor, whether attribute data corresponding to the received graph node identifier is cached in a first memory at the target memory address; and in response to determining that the attribute data is not cached in the first memory: fetching, by the processor, the attribute data from a second memory, and writing, by the processor, the fetched attribute data into the first memory at the target memory address.

Embodiments disclosed in the specification have one or more technical effects. In some embodiments, a multi-level attribute data caching architecture is designed to improve the memory access efficiency for retrieving graph node attribute data and thus the overall performance of GNN computations. The multi-level attribute data caching architecture may increase the cache-hit chances for graph node attribute data. For example, in existing solutions, when a new graph node attribute data needs to be stored into the attribute RAM at a target memory address, the existing attribute data stored at the target memory address will be evicted from the RAM. If the evicted attribute data is needed in the subsequent computations, it has to be read from an external memory or storage medium, which is usually larger in capacity but slower in access speed compared to the attribute RAM. The multi-level attribute data caching architecture described herein introduces another layer of cache as a staging area to store the to-be-evicted attribute data. This additional layer of cache allows the to-be-evicted attribute data to have another chance to be hit again in the RAM and thereby avoiding the expensive external data retrieval. In some embodiments, the multi-level attribute data caching architecture may be implemented using existing memories within the hardware accelerators without requiring additional hardware/memory chips. For instance, the multiple levels of caches may be implemented as multiple sections of the existing RAM. This compatibility with existing hardware makes the adoption of the multi-level attribute data caching architecture easy and practical.

These and other features of the systems, methods, and hardware devices disclosed, and the methods of operation and functions of the related elements of structure and the combination of parts and economies of manufacture will become more apparent upon consideration of the following description and the appended claims referring to the drawings, which form a part of this specification, where like reference numerals designate corresponding parts in the figures. It is to be understood, however, that the drawings are for illustration and description only and are not intended as a definition of the limits of the invention.

DETAILED DESCRIPTION

Figure 1:
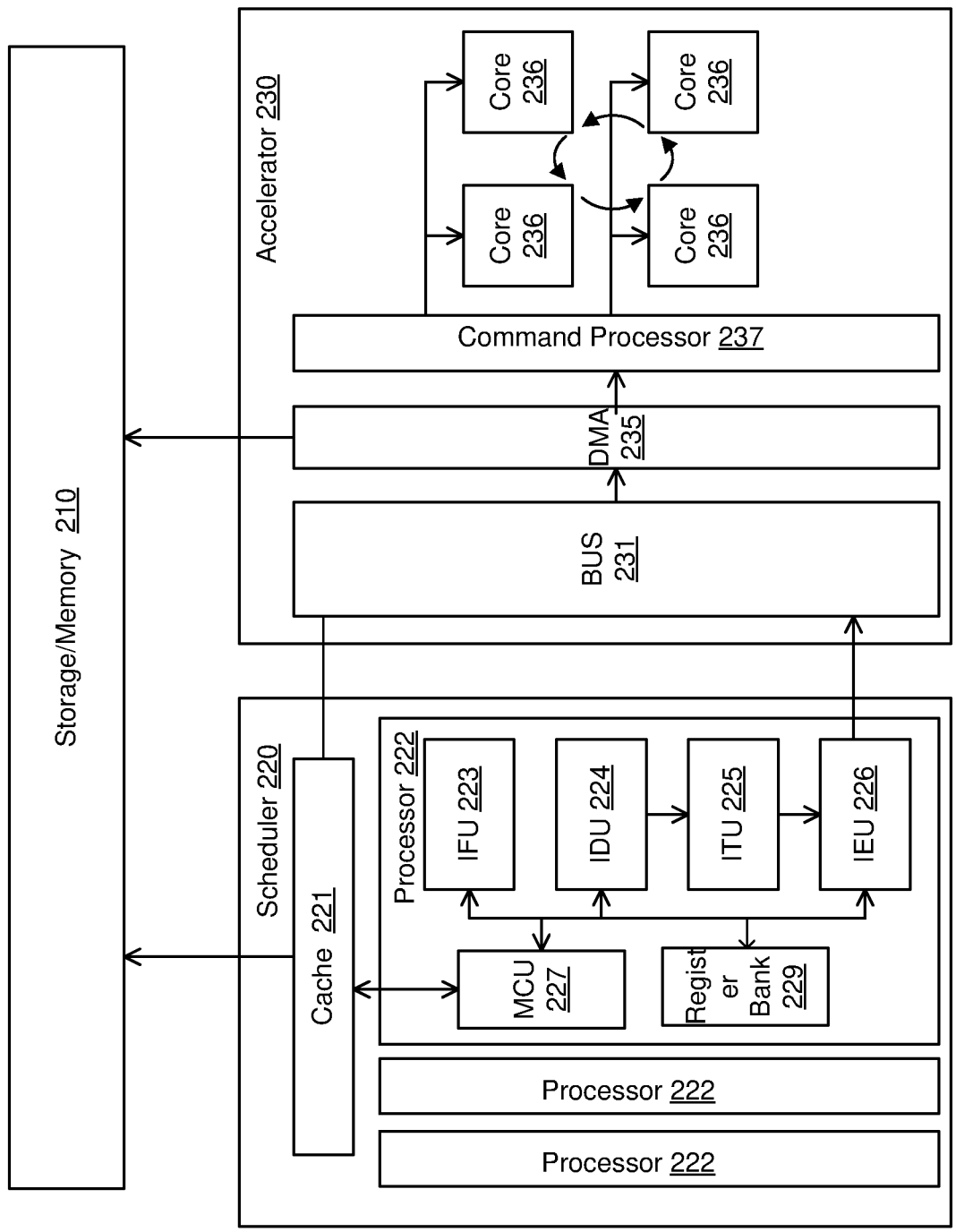
FIG. 1 illustrates a schematic diagram of a hardware device for implementing hardware accelerators in accordance with some embodiments.

The specification is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present specification. Thus, the specification is not limited to the embodiments shown but is to be accorded the widest scope consistent with the principles and features disclosed herein.

Data can be structured or unstructured. For structured data, information may be arranged according to a pre-set data model or schema. For unstructured data, information may not be arranged using a preset-data model or a pre-defined manner. For example, a text file (e.g., emails, reports, etc.) can include information (e.g., individual letters or words) that does not have a pre-defined structure. As a result, the unstructured data can include irregularities and ambiguities that make it difficult to understand using traditional programs or data structures.

One way to represent unstructured data is by using graphs. A graph is a data structure including two components—nodes (or vertices) and edges. For example, a graph G can be defined as a collection of a set of nodes V and a set of edges E between the set of nodes. A node in a graph can have a set of features or attributes (e.g., a user profile). For example, a node can have up to f number of features. As a result, for a graph with n number of nodes, a node feature matrix can have a dimension of n by f. A node can be defined as an adjacent/neighboring node of another node, if the node shares an edge with the other node. The graph can be a highly flexible data structure, as the graph may not require pre-defined rules to determine how many nodes or edges there has to be in the graphs. Because the graph can provide great flexibility, it is one of the data structures that are widely used to store or represent unstructured data (e.g., text files).

Graph Neural Network (GNN) is a type of neural network that can directly operate on graphs that have gained increasing popularity in various domains, including social networks, knowledge graphs, recommender systems, and even life science applications. The graph may have different practical meanings depending on the use cases. For example, a GNN may mine the features of users on a social media network and thereby learning the relationships among the users. As another example, nano-scale molecules have an inherent graph-like structure with the ions or the atoms being the nodes and the bonds between them, edges. GNNs can be applied to learn about existing molecular structures and discover new chemical structures. At a high level, GNN involves computation on a graph structure G=(V, E) representing a graph (undirected or directed), where V denotes vertices, E denotes edges, and (V, E) may be denoted as the data set in the graph. Each of the nodes and edges in the graph may be associated with attribute data. Therefore, efficiently storing and accessing attribute data of the graph nodes or edges is critical for improving the overall GNN computation performance.

FIG. 1 illustrates a schematic diagram of a hardware device for implementing hardware accelerators in accordance with some embodiments. The hardware device in FIG. 1 illustrates internal structures of a scheduler 220 and a GNN accelerator 230 for GNN computations, as well as data/instruction flows among the scheduler 220, the accelerator 230, and an external storage/memory 210.

As shown in FIG. 1, the scheduler 220 may include multiple processors 222 and a cache 221 shared by the multiple processors 222. Each processor 222 may include an instruction fetching unit (IFU) 203, an instruction decoding unit (IDU) 224, an instruction transmitting unit (ITU) 225, and an instruction execution unit (IEU) 226.

In some embodiments, the IFU 223 may fetch to-be-executed instructions or data from the storage/memory 210 to a register bank 229. After obtaining the instructions or data, the scheduler 220 enters an instruction decoding stage. The IDU 224 decodes the obtained instruction according to a predetermined instruction format to determine operand(s) acquisition information, where the operands are required to execute the obtained instruction. In some embodiments, the operand(s) acquisition information may include pointers or addresses of immediate data, registers, or other software/hardware that provide the operand(s).

In some embodiments, the ITU 225 may be configured between the IDU 224 and the IEU 226 for instruction scheduling and management. It may efficiently allocate instructions to different IEUs 226 for parallel processing.

In some embodiments, after the ITU 225 allocates an instruction to one IEU 226, the IEU 226 may execute the instruction. However, if the IEU 226 determines that the instruction should be executed by the accelerator 230, it may forward the instruction to the corresponding accelerator 230 for execution. For example, if the instruction is directed to GNN computation based on an input graph, the IEU 226 may send the instruction to the accelerator 230 via a bus 231 for the accelerator 230 to execute the instruction.

In some embodiments, the accelerator 230 may include multiple cores 236 (4 cores 236 are shown in FIG. 1, but those skilled in the art may appreciate that the accelerator 230 may also include other numbers of cores 236), a command processor 237, and a direct storage access (DMA) interface 235, and the bus channel 231.

The bus channel 231 may include a channel through which instructions/data enter and exit the accelerator 230. The DMA interface 235 may refer to a function provided by some computer bus architectures, which enables devices to directly read data from and/or write data to the memory 210. Compared with the method in which all data transmission between devices passes through the scheduler 220, the architecture illustrated in FIG. 1 greatly improves the efficiency of data access. For instance, the core of the accelerator 230 may directly access the memory 210 and read the parameters of a neural network model (for example, the weight of each node in a graph) and/or input data.

The command processor 237 may be configured to allocate the instructions sent by the scheduler 220 via the IEU 226 to the accelerator 230 to the cores 236 for execution. After the to-be-executed instructions enter the accelerator 230 from the bus channel 231, they may be cached in the command processor 237, and the command processor 237 may select the cores 236 and allocate the instructions to the cores 236 for execution. In addition, the command processor 237 may be also responsible for the synchronization operation among the cores 236.

Figure 2:
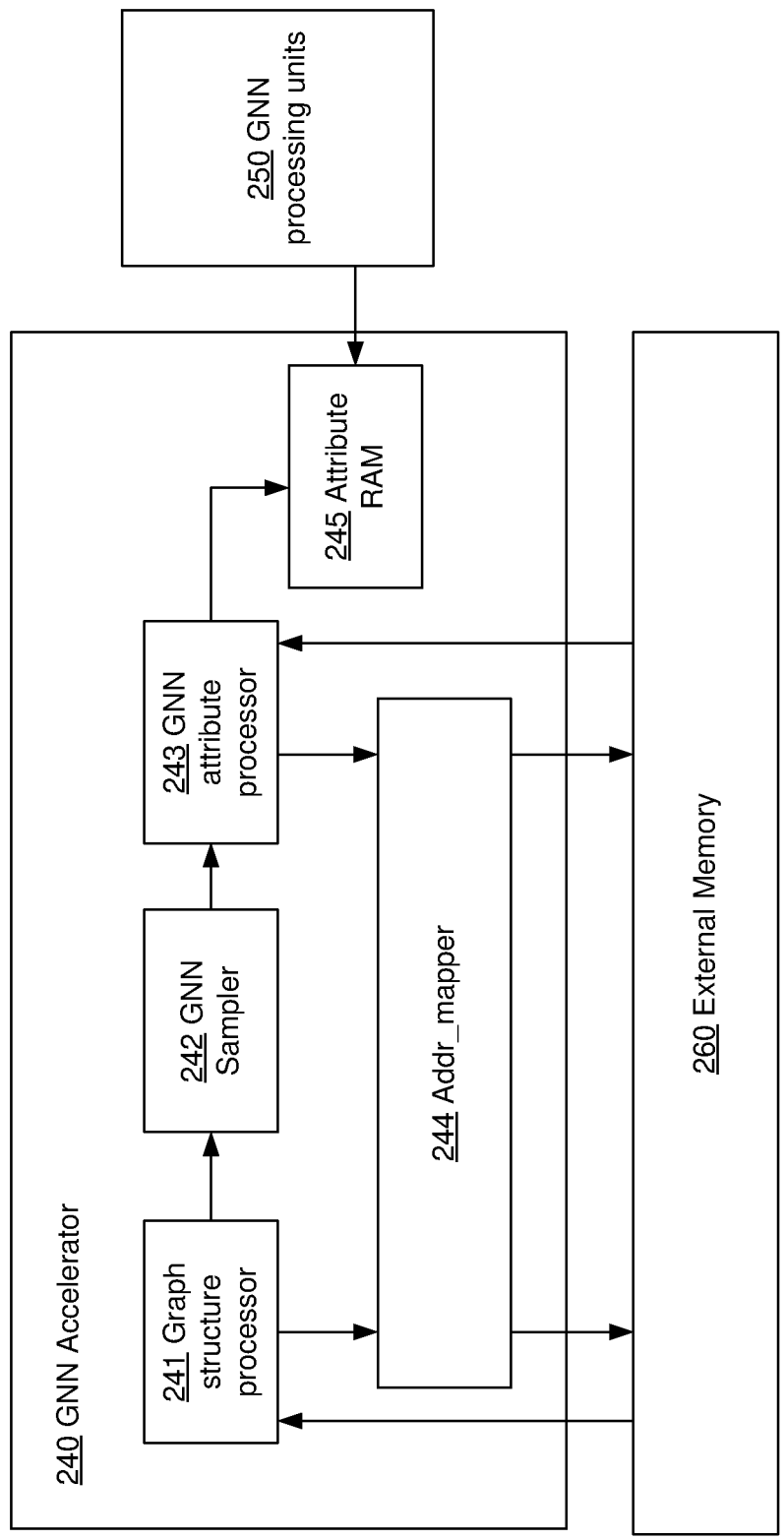
FIG. 2 illustrates an internal structure diagram of a GNN accelerator for accelerating GNN computations in accordance with some embodiments.

GNN computations are heavily dependent on the graph structure and the attribute data of the nodes/edges within the graph structure. For example, the attribute data of each node, commonly represented as a feature vector, is embedded via aggregate-combine functions iteratively in the GNN computation phase to incorporate the interdependence or relationship between the node and its neighboring nodes. During this process, the GNN accelerator 230 needs to retrieve the attribute data of graph nodes/edges of interest and feed the retrieved data to attribute processing units (e.g., processors like central processing units (CPU), graphic processing units (GPU), tensor processing units (TPU), neural processing units (NPU), etc.) for computation. This step of attribute data retrieval in the GNN accelerator is often deemed as the performance bottleneck due to the large volume of data to be retrieved and the slow access speed of the external memory 210. To address this issue, the GNN accelerator 230 may provide an attribute cache to hold the attribute data that are retrieved from the external memory 210 and for the consumption of the attribute processing units. FIG. 2 describes an exemplary architecture and data flow of the GNN accelerator 230 on attribute data access (e.g., retrieval and storage).

FIG. 2 illustrates an internal structure diagram of a GNN accelerator 240 for accelerating GNN computations in accordance with some embodiments. The diagram in FIG. 2 merely illustrates the hardware components related to the attribute data retrieval and storage, and depending on the implementation, the GNN accelerator 240 may include more, fewer, or alternative components for implementing other proper functionalities.

As shown in FIG. 2, the GNN accelerator 240 includes a graph structure processor 241, a GNN sampler 242, a GNN attribute processor 243, a memory address mapper 244 (denoted as Addr_mapper in FIG. 2), and an attribute random access memory (RAM) 245. The attribute random RAM 245 may be referred to an internal memory bank within the GNN accelerator 240. In comparison, an external memory 260 shown in FIG. 2 refers to a memory bank or storage media that is separated from the GNN accelerator 240. In general, the attribute random RAM 245 provides faster data accessing speed than the external memory 260 does, while the external memory 260 offers a higher storage capacity than the attribute random RAM 245 does.

In some embodiments, the graph structure processor 241 may be configured to identify graph nodes or edges of interest for conducting GNN computations. For example, to compute a feature representation of a given root graph node, the "graph nodes of interest" may include neighboring nodes of the root graph node whose features are to be embedded into the feature representation of the given root graph node. In order to identify the neighboring nodes, the graph structure processor 241 may access the information of the graph structure. Based on the information of the graph structure and the root graph node, the graph structure processor 241 may determine the graph node identifiers of the neighboring graph nodes. In some embodiments, the graph structure processor 241 may obtain the information of the graph structure related to the root graph node using the Addr_mapper 244. For example, the graph structure processor 241 may input the identifier ((hereafter referred to as ID) of the root graph node into the Addr_mapper 244 to determine a physical memory address in the external memory 260. Based on the data stored at the physical memory address in the external memory 260, the graph structure processor 241 may identify the plurality of neighboring graph nodes that may be involved in the subsequent GNN computations.

In some embodiments, instead of performing the GNN computations on all of the plurality of neighboring graph nodes determined by the graph structure processor 241, the GNN sampler 242 may sample a subset of the graph nodes to reduce the amount of data to be retrieved and computed. The GNN sampler 242 may perform positive sampling, negative sampling, or both. The positive sampling may sample those graph nodes that have connections (direct or indirect) via edges with the root graph node (e.g., a subset of the neighboring graph nodes). The negative sampling may sample those graph nodes that are not connected via edges with the root graph node (e.g., a subset of nodes that are different from the neighboring graph nodes). After sampling, the GNN sampler 242 may send the IDs of the sampled graph nodes to the GNN attribute processor 243 to retrieve the attributed data of the sampled graph nodes. The attribute data of the sampled graph nodes will be involved in the subsequent GNN computations.

In some embodiments, the GNN attribute processor 243 may be configured to receive an ID of a sampled graph node from the GNN sampler 242, locate attribute data of the sampled graph node and store the attribute data into the attribute RAM 245 for the consumption of the GNN processing units 250, such as CPU, GPU, TPU, NPU, etc. The GNN attribute processor 243 may first check if the attribute data of the graph node has already been read into (from the previous iteration) the attribute RAM 245 from the previous iterations. If the attribute data is already in the attribute RAM 245, the GNN attribute processor 243 may skip one external memory access. By reducing the number of external memory accesses, the GNN accelerator 240 may effectively improve the attribute data access efficiency and thereby boosting the performance of overall GNN computations.

For example, if it is determined that the attribute data is not cached in the attribute RAM 245, the GNN attribute processor 243 may send the ID of the sampled graph node to the Addr_mapper 244 to determine the corresponding physical memory addresses in which the attribute data is stored in the external memory 260. The GNN attribute processor 243 may then retrieve the attribute data from the external memory 260 and store the retrieved attribute data into the attribute RAM 245. When storing the retrieved attribute data into the attribute RAM 245, the GNN attribute processor 243 may determine a target memory address in the attribute RAM 245 to store the retrieved attribute data. The target memory address may be determined in various ways, such as based on the ID of the sampled graph node and the addressable memory space (or size) of the attribute RAM 245, based on a hash value generated based on the ID of the sample graph node, etc.

In some embodiments, if it is determined that the attribute data is already cached in the attribute RAM 245 but at a memory address that is different from the target memory address, the GNN attribute processor 243 may swap the attribute data with the data previously stored at the target memory address. After swapping, the attribute data of the sample graph node is properly stored at the target memory address, while the data previously stored at the target memory address is now moved to the location in which the attribute data of the sample graph node was previously stored.

Figure 3:
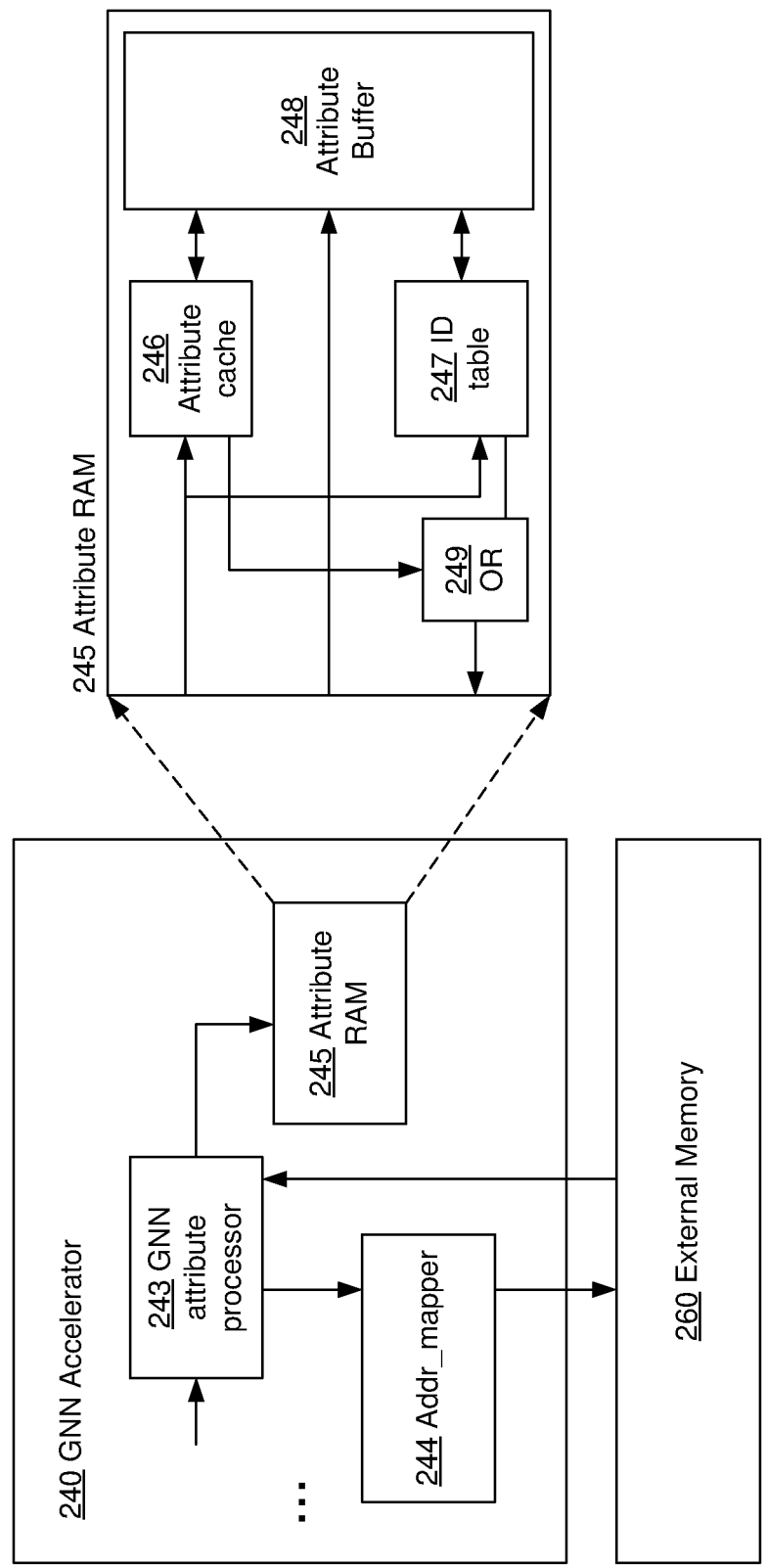
FIG. 3 illustrates an exemplary GNN accelerator architecture with multi-level attribute caching in accordance with some embodiments.

FIG. 3 illustrates an exemplary GNN accelerator architecture with multi-level attribute caching in accordance with some embodiments. In some embodiments, the multi-level attribute caching may be implemented within the attribute RAM 245 in the GNN accelerator using existing hardware. For example, the attribute RAM 245 may be split into multiple sections to implement the multi-level attribute caching. In other embodiments, new hardware pieces may be added to the GNN accelerator 240, such as new cache/memory chips, to achieve the multi-level attribute caching. The components illustrated in FIG. 3 are for illustrative purposes. Depending on the implementation, the attribute RAM 245 may include more, fewer, or alternative components to implement the multi-level attribute caching.

In some embodiments, the attribute RAM 245 may include two levels of caches. In FIG. 3, the first-level cache is referred to as an attribute buffer 248, and the second-level cache is referred to as an attribute cache 246. The first-level cache may be configured to store the attribute data of the graph nodes previously fetched from the external memory; and the second-level cache in data communication with the first level cache may be configured to store attribute data of graph nodes evicted from the first-level cache. In some embodiments, before reading the attribute data of a given graph node from the external memory 260, the GNN attribute processor 243 checks if the attribute data is already stored in either the first level cache or the second-level cache. If either of the two levels of cache has the attribute data, the external memory 260 access may be skipped. The GNN attribute processor 243 may check the two levels of cache in parallel, and the results may be fed into an "OR" gate 249 (e.g., an electronic circuit) to determine whether it is already in the attribute RAM 245.

In some embodiments, the first level cache, i.e., the attribute buffer 248, may have a corresponding ID table 247 that stores mappings between graph node IDs and memory addresses within the attribute buffer 248. Each memory address indicates the location in the attribute buffer 248 in which the attribute data corresponding to the graph node ID are stored. In some embodiments, the ID table 247 may be implemented as a hash table. To check if the attribute data of a graph node is stored in the attribute buffer 248, a hash value may be generated based on the ID of the graph node and then check if it exists in the ID table 247.

The second-level cache, i.e., the attribute cache 246, provides a staging area for the attribute data evicted from the attribute buffer 248. Instead of being directly evicted and discarded, storing these attribute data in the second-level cache offers them second chances to be hit again in the GNN attribute RAM 245. Empirical data shows that these "second chances" improve the cache hit rate of the attribute RAM 245 and thus reduce the number of accesses to the external memory 260. In an experiment with a graph containing 2050 nodes, the size attribute buffer 248 is configured to 100 KB (can hold attribute data for 200 nodes), the size of the attribute cache 246 is configured to 15 KB (can hold attribute data for 30 nodes), the ID table 247 is configured to 0.4 KB (can hold IDs for 200 nodes). The multi-level caching saves 45% external memory accesses with merely 15% more memory consumption (e.g., the 15 KB of the attribute cache 246 over the 100 KB of the attribute buffer 248). One of the major reasons behind these increased cache hits is that graph data has strong data locality, i.e., different root nodes in a close proximity in a graph may likely share neighboring nodes. Therefore, GNN computations on different graph root nodes may need the attribute data of the same neighboring nodes.

Figure 4:
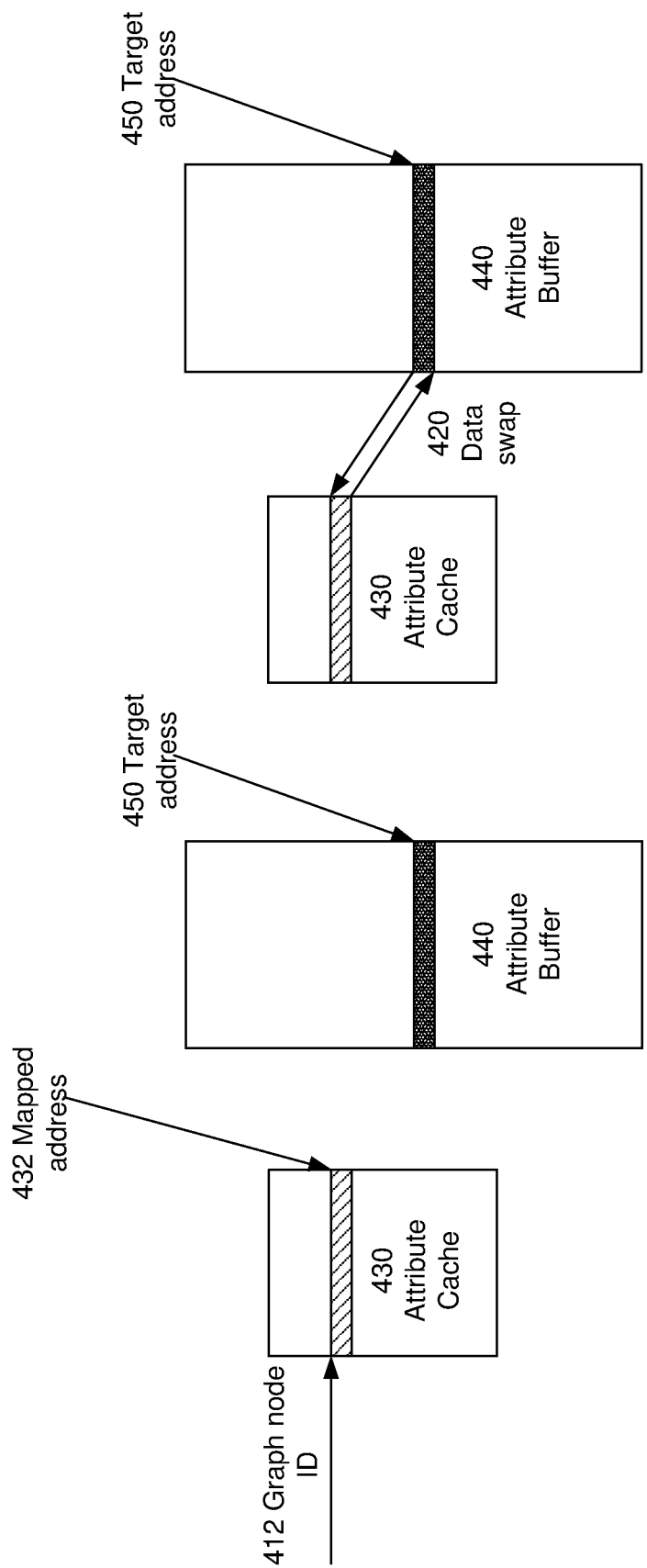
FIG. 4 illustrates an exemplary data flow in a GNN accelerator architecture with multi-level attribute caching in accordance with some embodiments.

FIG. 4 illustrates an exemplary data flow in a GNN accelerator architecture with multi-level attribute caching in accordance with some embodiments. The data flow involves an attribute buffer 440 (i.e., a first-level cache) and an attribute cache 430 (i.e., a second-level cache), respectively corresponding to the two levels of cache 248 and 246 in FIG. 3.

In some embodiments, the first-level cache, i.e., the attribute buffer 440, serves as an attribute data repository from which GNN attribute processing units (e.g., GNN processing units 250 in FIG. 2) can retrieve the data for a GNN computation. The second-level cache, i.e., the attribute cache 430, may write its locally cached data into the first-level cache but may not allow direct access to the GNN attribute processing units.

In some embodiments, the attribute data of a given graph node needs to be stored in the attribute buffer 440 at a specified target memory address 450, so that the GNN attribute processing units may have information on where to read the attribute data for computation. In some embodiments, the "target memory address" 450 of the attribute data of the given graph node may be determined by a GNN attribute processor based on the given graph node ID and/or the size of the attribute buffer 440 (e.g., a hash value generated based on the graph node ID).

The scenario illustrated in FIG. 4 shows that the attribute data of interest is cached in the attribute cache 430 and subsequently moved to the attribute buffer 440 at the target memory address 450.

In some embodiments, in order to check if attribute data of a given graph node is stored in the attribute cache 430, a graph node ID 412 may be checked against the attribute cache 430. If there is no cache hit, the attribute data is not in the attribute cache 430. If there is a cache hit, the attribute data is located within the attribute cache 430 at a mapped address 432. The attribute data stored at the mapped address 432 in the attribute cache 430 may be swapped (data swap 420) with the original attribute data stored at the target memory address 450 in the attribute buffer 440. After the data swap 420, the attribute data of interest (of the given graph node) is stored at the target memory address 450 in the attribute buffer 440, and the original attribute data is now placed in the attribute cache 430 (e.g., a staging area) at the mapped address 432 for future cache hits.

Figure 5:
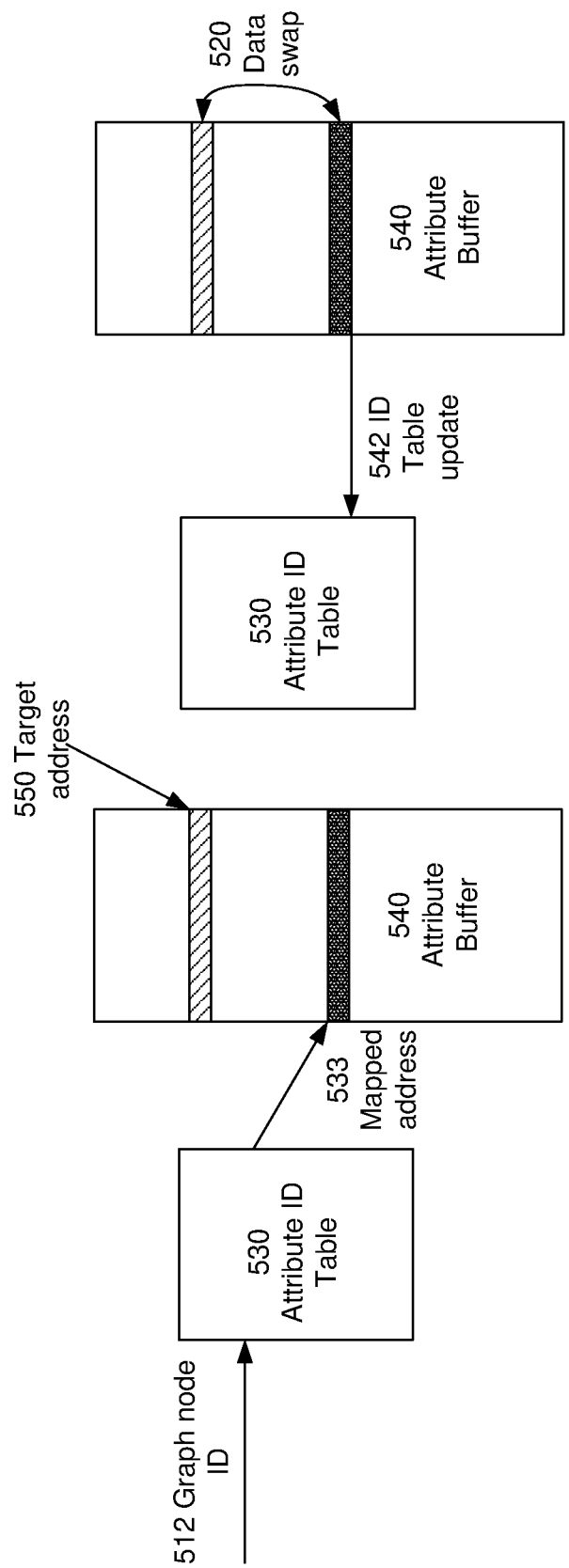
FIG. 5 illustrates another exemplary data flow in a GNN accelerator architecture with multi-level attribute caching in accordance with some embodiments.

FIG. 5 illustrates another exemplary data flow in a GNN accelerator architecture with multi-level attribute caching in accordance with some embodiments. The data flow involves an attribute buffer 540 and an attribute ID table 530, respectively corresponding to the two levels of cache 248 and 247 in FIG. 3.

In some embodiments, the attribute ID table 530 stores a mapping between graph node IDs and memory addresses in the attribute buffer 540. The memory addresses indicate where the attribute data corresponding to the graph node IDs is stored in the attribute buffer 540. In some embodiments, the attribute ID table 530 may be implemented as a hash table. In order to check if attribute data of a given graph node is stored in the attribute buffer 540, the graph node ID 512 of the given graph node may be used to compute a hash value. If the hash value exists in the attribute ID table 530, it means the attribute data of the given graph node is in the attribute buffer 540 at a mapped memory address 533. As pointed out above, the attribute data of the given graph node needs to be stored at a target memory address 550 in the attribute buffer 540. Therefore, when the attribute data of the given graph node is cached in the attribute buffer 540 but at a mapped address 533 that is different from the target memory address 550, the attribute data may be swapped (data swap 520) with the existing attribute data stored at the target address 550. After the data swap 520, the attribute data of the given graph node is stored at the target address 550. In some embodiments, the data swap 520 may trigger an ID table update 542 to update the attribute ID table 530 to reflect the memory location changes caused by the data swap 520.

Figure 6:
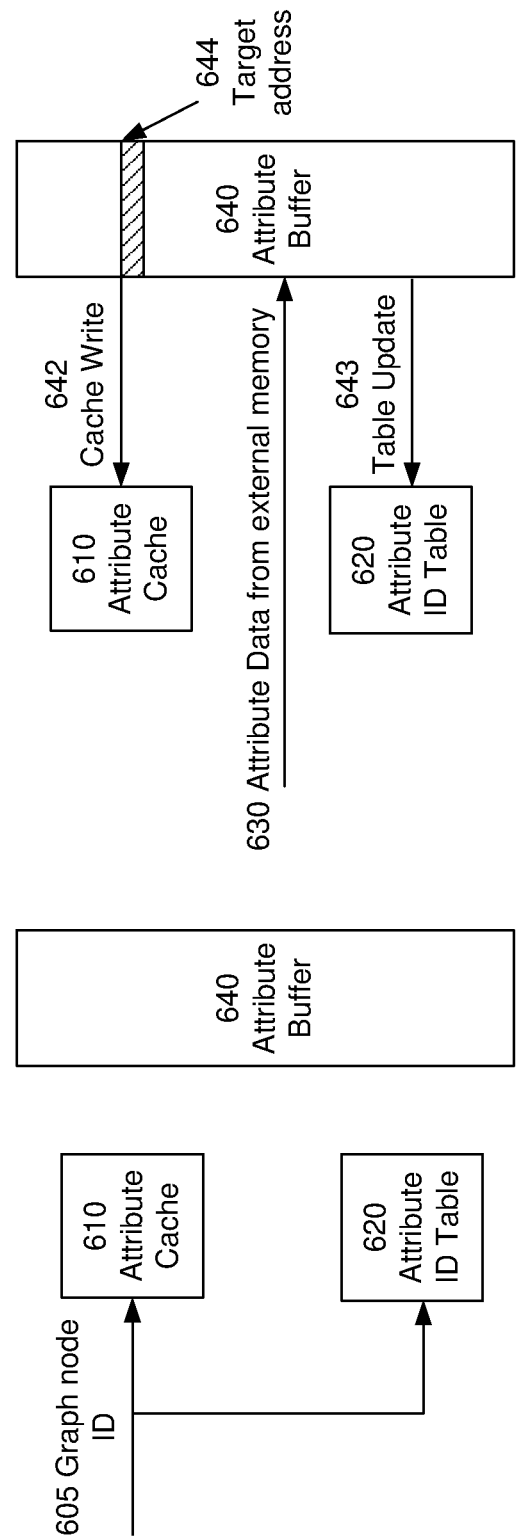
FIG. 6 illustrates yet another exemplary data flow in a GNN accelerator architecture with multi-level attribute caching in accordance with some embodiments.

FIG. 6 illustrates yet another exemplary data flow in a GNN accelerator architecture with multi-level attribute caching in accordance with some embodiments. The data flow involves an attribute cache 610 (a second-level cache), an attribute buffer 640 (a first-level cache), and an attribute ID table 620. In some embodiments, the attribute ID table 620 is associated with the attribute buffer 640 and serves as an index of the attribute data stored in the attribute buffer 640. The attribute cache 610 may be another level of cache that is separated from the attribute buffer 640 and its associated attribute ID table 620. This multi-level attribute caching mechanism may effectively reduce the number of external memory accesses and thereby improving the performance of attribute data retrieval as well as the overall GNN computation.

When a GNN attribute data processor (e.g., 243 in FIG. 3) needs to retrieve attribute data of a given graph node (e.g., a sampled neighboring node or a sampled negative node), it first checks whether the attribute data is cached, either in the attribute cache 610 or in the attribute buffer 640. For example, the graph node ID 605 of the given graph node may be input to the attribute ID table 620 to determine whether the corresponding attribute data is stored in the attribute buffer 640, and input to the attribute cache 610 to determine whether the corresponding attribute data is stored therein.

In FIG. 6, it is presumed that the attribute data corresponding to the graph node ID 605 is not stored in the attribute cache 610 or the attribute buffer 640. The data flow in FIG. 6 shows how the corresponding attribute data 630 retrieved from the external memory is populated into the multi-level attribute cache. In some embodiments, the attribute data 630 may be written at a target memory address 644 in the attribute buffer 640. Instead of overwrite the existing attribute data previously stored at the target address 644 in the attribute buffer 640, the existing attribute data previously stored at the target address 644 may be migrated (cache write 642) into the attribute cache 610. If the attribute cache 610 is already full, the cache write 642 may cause the attribute cache 610 to evict one or more cache entries according to a cache replacement policy. The cache replacement policy may include at least one of ranking of degree, least recently used (LRU), least-frequently used (LFU), most recently used (MRU), first in first out (FIFO), last in first out (LIFO), first in last out (FILO), or another suitable cache replacement policy.

In some embodiments, both the write of the attribute data 630 at the target address 644 and the migration of the existing attribute data from the attribute buffer 640 into the attribute cache 610 need to be reflected in the attribute ID table 620 through table update 643. For example, a new mapping between the graph node ID 605 and the target address 644 may be added into the attribute ID table 620, and the existing mapping associated with the migrated attribute data (now stored in the attribute cache 610) may be removed from the attribute ID table 620.

Figure 7:
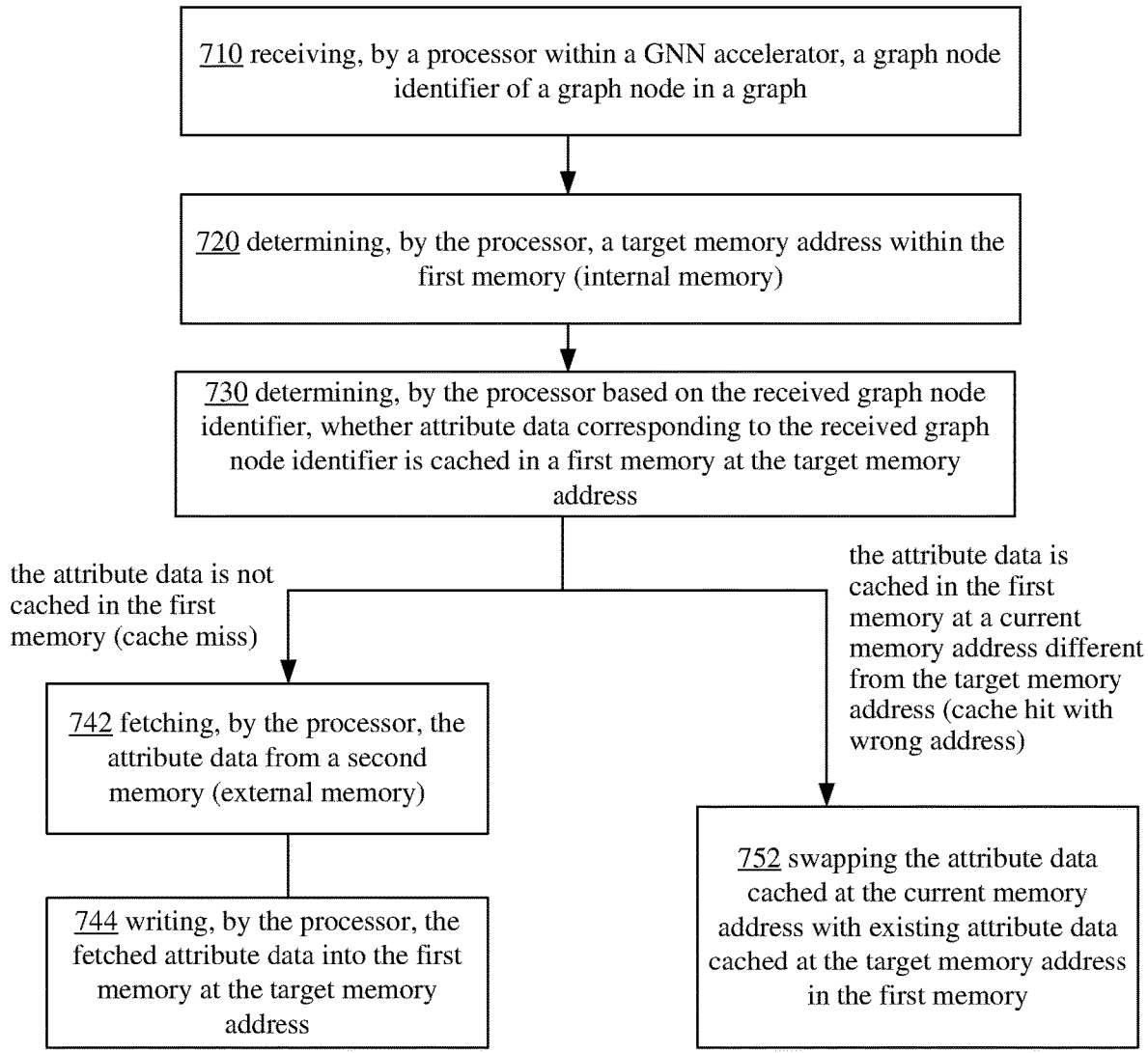
FIG. 7 illustrates an exemplary method of accelerating GNN attribute access with multi-level attribute caching in accordance with some embodiments.

FIG. 7 illustrates an exemplary method 700 of accelerating GNN attribute access with multi-level attribute caching in accordance with some embodiments. The method 700 may be implemented in an environment shown in FIG. 1. The method 700 may be performed by a device, apparatus, or system illustrated by FIGS. 1-6, such as the accelerator 240 or the GNN attribute processor 243. Depending on the implementation, the method 700 may include additional, fewer, or alternative steps performed in various orders or parallel.

Block 710 includes receiving, by a processor within a GNN accelerator, a graph node identifier of a graph node in a graph.

Block 720 includes determining, by the processor, a target memory address within the first memory (corresponding to the attribute RAM 245 in FIG. 2 or the attribute buffer 248 in FIG. 3).

Block 730 includes determining, by the processor, whether attribute data corresponding to the received graph node identifier is cached in a first memory at the target memory address.

Block 742 includes, if there is a cache miss (e.g., the attribute data corresponding to the received graph node identifier is not cached in a first memory), fetching, by the processor, the attribute data from a second memory (corresponding to the external memory 260 in FIG. 3); and block 744 includes writing, by the processor, the fetched attribute data into the first memory at the target memory address. In some embodiments, the method 700 may further include storing, by the processor into a graph node identifier table, a mapping between the received graph node identifier and the target memory address in which the attribute data corresponding to the received graph node identifier is stored.

In some embodiments, the first memory includes a first-level cache (corresponding to the attribute buffer 248 in FIG. 3) and a second-level cache (corresponding to the attribute cache 246 in FIG. 3), and the mapping in the graph node identifier table is between the received graph node identifier and the target memory addresses in the first-level cache. In some embodiments, the writing the fetched attribute data into the first memory at the target memory address includes: writing existing attribute data previously stored at the target memory address in the first-level cache into the second-level cache; and writing the fetched attribute data into the first-level cache at the target memory address.

In some embodiments, the determining whether the attribute data corresponding to the received graph node identifier is cached in the first memory includes: determining whether the attribute data is cached in the second-level cache of the first memory based on the received graph node identifier; in response to determining that the attribute data is not cached in the second-level cache, determining whether the graph node identifier table includes an entry corresponding to the received graph node identifier; and in response to determining that the graph node identifier table does not include the entry corresponding to the received graph node identifier, determining that the attribute data is not cached in the first memory.

Block 752 includes, if there is a cache hit with a wrong memory address (e.g., the attribute data corresponding to the received graph node identifier is cached in a first memory but at a current memory address different from the target memory address), swapping the attribute data cached at the current memory address with existing attribute data cached at the target memory address in the first memory.

Figure 8:
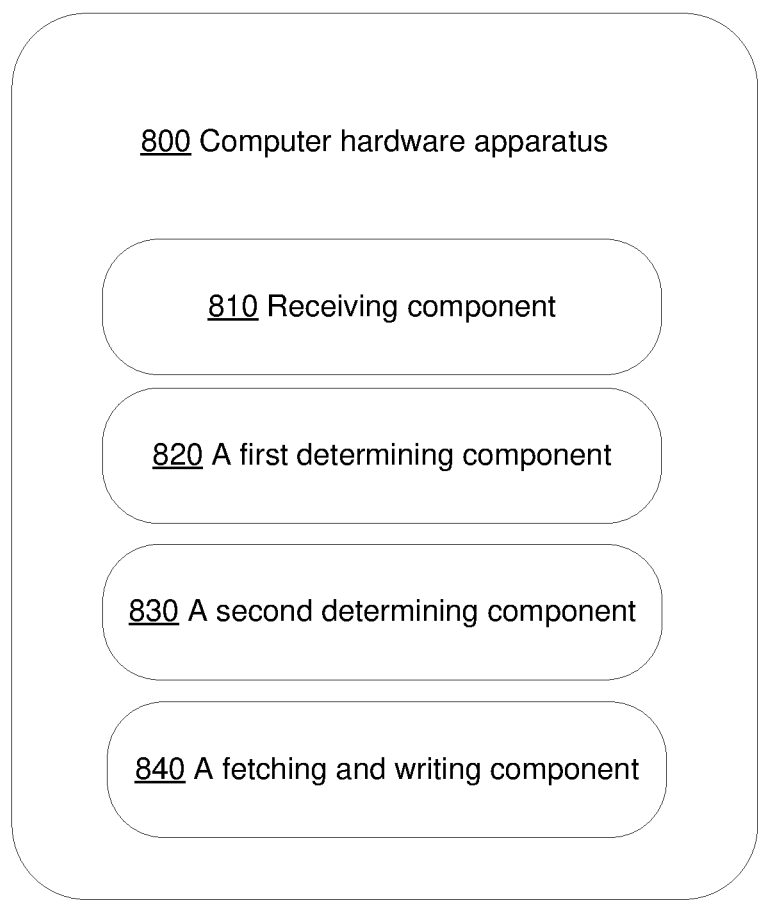
FIG. 8 illustrates a block diagram of a computer system apparatus for accelerating GNN attribute access with multi-level attribute caching in accordance with some embodiments.

FIG. 8 illustrates a block diagram of a computer system apparatus 800 for accelerating GNN attribute access with multi-level attribute caching in accordance with some embodiments. The components of the computer system apparatus 800 presented below are intended to be illustrative. Depending on the implementation, the computer system apparatus 800 may include additional, fewer, or alternative components.

The computer system apparatus 800 may be an example of implementing the method of FIG. 7. The computer system apparatus 800 may include one or more processors and one or more non-transitory computer-readable storage media (e.g., one or more memories) coupled to the one or more processors and configured with instructions executable by the one or more processors to cause the system or device (e.g., the processor) to perform the above-described embodiments. The computer system apparatus 800 may include various units/modules corresponding to the instructions (e.g., software instructions).

In some embodiments, the computer hardware apparatus 800 may be referred to as an apparatus for accelerating GNN attribute access with multi-level attribute caching. The computer hardware apparatus 800 may a receiving component 810, a first determining component 820, a second determining component 830, and a fetching and writing component 840. These components may be implemented by the hardware devices and electronic circuits illustrated in FIGS. 1-7.

In some embodment's, the receiving component 810 may be configured to receive a graph node identifier for fetching attribute data corresponding to the graph node identifier. The first determining component 820 may be configured to determine a target memory address within the first memory based on the graph node identifier. The second determining component 830 may be configured to determine, based on the received graph node identifier, whether attribute data corresponding to the received graph node identifier is cached in the first memory at the target memory address. The fetching and writing component 840 may be configured to in response to determining that the attribute data is not cached in the first memory: fetch the attribute data from a second memory, and write the fetched attribute data into the first memory at the target memory address.

Each process, methods, and algorithms described in the preceding sections may be embodied in, and fully or partially automated by, code modules executed by one or more computer systems or computer processors including computer hardware. The processes and algorithms may be implemented partially or wholly in application-specific circuit.

When the functions disclosed herein are implemented in the form of software functional units and sold or used as independent products, they can be stored in a processor executable non-volatile computer-readable storage medium. Particular technical solutions disclosed herein (in whole or in part) or aspects that contribute to current technologies may be embodied in the form of a software product. The software product may be stored in a storage medium, including a number of instructions to cause a computing device (which may be a personal computer, a server, a network device, and the like) to execute all or some steps of the methods of the embodiments of the present application. The storage medium may include a flash drive, a portable hard drive, ROM, RAM, a magnetic disk, an optical disc, another medium operable to store program code, or any combination thereof.

Particular embodiments further provide a system including a processor and a non-transitory computer-readable storage medium storing instructions executable by the processor to cause the system to perform operations corresponding to steps in any method of the embodiments disclosed above. Particular embodiments further provide a non-transitory computer-readable storage medium configured with instructions executable by one or more processors to cause the one or more processors to perform operations corresponding to steps in any method of the embodiments disclosed above.

Embodiments disclosed herein may be implemented through a cloud platform, a server or a server group (hereinafter collectively the "service system") that interacts with a client. The client may be a terminal device, or a client registered by a user at a platform, where the terminal device may be a mobile terminal, a personal computer (PC), and any device that may be installed with a platform application program.

The various features and processes described above may be used independently of one another or may be combined in various ways. All possible combinations and sub-combinations are intended to fall within the scope of this disclosure. In addition, certain methods or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner Blocks or states may be added to or removed from the disclosed example embodiments. The exemplary systems and components described herein may be configured differently than described. For example, elements may be added to, removed from, or rearranged compared to the disclosed example embodiments.

The various operations of example methods described herein may be performed, at least partially, by an algorithm. The algorithm may be included in program codes or instructions stored in a memory (e.g., a non-transitory computer-readable storage medium described above). Such algorithm may include a machine learning algorithm. In some embodiments, a machine learning algorithm may not explicitly program computers to perform a function but can learn from training data to make a prediction model that performs the function.

The various operations of example methods described herein may be performed, at least partially, by one or more processors that are temporarily configured (e.g., by software) or permanently configured to perform the relevant operations. Whether temporarily or permanently configured, such processors may constitute processor-implemented engines that operate to perform one or more operations or functions described herein.

Similarly, the methods described herein may be at least partially processor-implemented, with a particular processor or processors being an example of hardware. For example, at least some of the operations of a method may be performed by one or more processors or processor-implemented engines. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)).

The performance of certain of the operations may be distributed among the processors, not only residing within a single machine, but deployed across a number of machines. In some example embodiments, the processors or processor-implemented engines may be located in a single geographic location (e.g., within a home environment, an office environment, or a server farm). In other example embodiments, the processors or processor-implemented engines may be distributed across a number of geographic locations.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the subject matter has been described with reference to specific example embodiments, various modifications and changes may be made to these embodiments without departing from the broader scope of embodiments of the present disclosure. Such embodiments of the subject matter may be referred to herein, individually or collectively, by the term "invention" merely for convenience and without intending to voluntarily limit the scope of this application to any single disclosure or concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

Any process descriptions, elements, or blocks in the flow diagrams described herein and/or depicted in the attached figures should be understood as potentially representing modules, segments, or sections of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art.

As used herein, "or" is inclusive and not exclusive, unless expressly indicated otherwise or indicated otherwise by context. Therefore, herein, "A, B, or C" means "A, B, A and B, A and C, B and C, or A, B, and C," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context. Moreover, plural instances may be provided for resources, operations, or structures described herein as a single instance. Additionally, boundaries between various resources, operations, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

The term "include" or "comprise" is used to indicate the existence of the subsequently declared features, but it does not exclude the addition of other features. Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

What is claimed is:

1. A hardware accelerator for accelerating Graph Neural Network (GNN) attribute access, comprising:
   a first memory configured to store attribute data of graph nodes previously fetched from a second memory; and
   a GNN attribute processor in data communication with the first memory, the GNN attribute processor configured to:
   receive a graph node identifier;
   determine a target memory address within the first memory based on the graph node identifier;
   determine, based on the received graph node identifier, whether attribute data corresponding to the graph node identifier is cached in the first memory at the target memory address; and
   in response to determining that the attribute data is not cached in the first memory:
   fetch the attribute data from the second memory, and
   write the fetched attribute data into the first memory at the target memory address.

2. The hardware accelerator of claim 1, wherein the first memory comprises:
   a first-level cache configured to store the attribute data of the graph nodes previously fetched from the second memory; and
   a second-level cache in data communication with the first-level cache, the second-level cache configured to store attribute data of graph nodes evicted from the first-level cache.

3. The hardware accelerator of claim 2, wherein the GNN attribute processor is further configured to:
   in response to determining that the attribute data corresponding to the graph node identifier is cached in the second-level cache, swap the attribute data cached in the second-level cache with existing attribute data stored at the target memory address in the first-level cache.

4. The hardware accelerator of claim 2, wherein the GNN attribute processor is further configured to:
   in order to write the fetched attribute data into the first memory at the target memory address, evict existing attribute data previously stored at the target memory address in the first-level cache into the second-level cache; and
   write the fetched attribute data into the first-level cache at the target memory address.

5. The hardware accelerator of claim 2, wherein the GNN attribute processor is further configured to:
   evict a data entry in the second-level cache according to a cache replacement policy, wherein the cache replacement policy comprises at least one of ranking of degree, least recently used (LRU), least-frequently used (LFU), most recently used (MRU), first in first out (FIFO), last in first out (LIFO), or first in last out (FILO).

6. The hardware accelerator of claim 2, wherein the GNN attribute processor is further configured to:
   determine that the attribute data corresponding to the graph node identifier is not cached in the first memory if the attribute data is not cached in either the first-level cache nor the second-level cache.

7. The hardware accelerator of claim 2, wherein the first-level cache and the second-level cache of the first memory are two different sections of a physical memory in the hardware accelerator.

8. The hardware accelerator of claim 1, wherein the GNN attribute processor is further configured to:
in response to determining that the attribute data corresponding to the graph node identifier is cached in the first memory but not at the target memory address, swap the attribute data corresponding to the graph node identifier with data previously stored at the target memory address in the first memory.

9. The hardware accelerator of claim 1, further comprising a graph node identifier table comprising a mapping between graph node identifiers and memory addresses, wherein the memory addresses indicate locations in the first memory in which attribute data corresponding to the graph node identifiers are stored.

10. The hardware accelerator of claim 9, wherein the GNN attribute processor is configured to:
in response to determining that the attribute data corresponding to the received graph node identifier is cached in the first memory but not at the target memory address, obtain, based on the received graph node identifier and the graph node identifier table, a mapped memory address in the first memory in which the attribute data is cached; and
swap the attribute data cached at the mapped memory address with attribute data stored at the target memory address in the first memory.

11. The hardware accelerator of claim 9, wherein the GNN attribute processor is further configured to:
write into the graph node identifier table an entry comprising the received graph node identifier and the target memory address.

12. The hardware accelerator of claim 9, wherein:
the first memory comprises a first-level cache and a second-level cache, and
the mapping in the graph node identifier table is between the graph node identifiers and the memory addresses of the first-level cache.

13. The hardware accelerator of claim 1, wherein the GNN attribute processor is further configured to:
determine the target memory address based on the received graph node identifier and a size of the first memory.

14. The hardware accelerator of claim 1, wherein:
the first memory is an internal memory located within the hardware accelerator, and
the second memory is an external memory located outside of the hardware accelerator.

15. A computer-implemented method, comprising:
receiving, by a processor within a GNN accelerator, a graph node identifier of a graph node in a graph;
determining, by the processor, a target memory address within a first memory;
determining, by the processor, whether attribute data corresponding to the graph node identifier is cached in the first memory at the target memory address; and
in response to determining that the attribute data is not cached in the first memory:
fetching, by the processor, the attribute data from a second memory, and
writing, by the processor, the fetched attribute data into the first memory at the target memory address.

16. The method of claim 15, further comprising:
in response to determining that the attribute data is cached in the first memory at a current memory address different from the target memory address, swapping the attribute data cached at the current memory address and existing attribute data cached at the target memory address in the first memory.

17. The method of claim 15, further comprising:
storing, by the processor into a graph node identifier table, a mapping between the received graph node identifier and the target memory address in which the attribute data corresponding to the graph node identifier is stored.

18. The method of claim 17, wherein the first memory comprises a first-level cache and a second-level cache, and
the mapping in the graph node identifier table is between the received graph node identifier and the target memory addresses in the first-level cache.

19. The method of claim 18, wherein the writing the fetched attribute data into the first memory at the target memory address comprises:
writing existing attribute data previously stored at the target memory address in the first-level cache into the second-level cache; and
writing the fetched attribute data into the first-level cache at the target memory address.

20. The method of claim 18, further comprising:
in response to determining that the attribute data corresponding to the graph node identifier is cached in the second-level cache, swapping the attribute data cached in the second-level cache with existing attribute data stored at the target memory address in the first-level cache.

* * * * *